United States Patent [19]

Hamilton et al.

[11] Patent Number: 5,366,572
[45] Date of Patent: Nov. 22, 1994

[54] OXAZOLINE BONDING AGENTS IN COMPOSITE PROPELLANTS

[75] Inventors: R. Scott Hamilton, Bear River City; Robert B. Wardle, Logan; Jerald C. Hinshaw, Pleasant View, all of Utah

[73] Assignee: Thiokol Corporation, Ogden, Utah

[21] Appl. No.: 65,173

[22] Filed: May 20, 1993

[51] Int. Cl.⁵ ............................................. C06B 45/10
[52] U.S. Cl. ................................. 149/19.9; 149/19.1; 149/19.4
[58] Field of Search ...................... 149/19.1, 19.4, 19.9

[56] References Cited

U.S. PATENT DOCUMENTS

| | | | |
|---|---|---|---|
| 3,662,802 | 5/1972 | Bedell | 149/19.1 |
| 3,948,698 | 4/1976 | Elvick et al. | 149/19.6 |
| 4,019,933 | 4/1977 | Cucksee et al. | 149/19.4 |
| 4,090,893 | 5/1978 | Cucksee et al. | 149/19.9 |
| 4,214,928 | 7/1980 | Consaga | 149/19.9 |
| 4,289,551 | 9/1981 | Perrault et al. | 149/19.4 |
| 4,315,830 | 2/1982 | French et al. | 252/182 |
| 4,427,468 | 1/1984 | Duchesne et al. | 149/19.9 |
| 4,658,578 | 4/1987 | Shaw | 149/19.4 |
| 4,747,891 | 5/1988 | Finck et al. | 149/19.4 |
| 4,915,755 | 4/1990 | Kim | 149/19.4 |
| 4,944,815 | 7/1990 | Consaga | 149/19.1 |
| 5,112,417 | 5/1992 | Sayles | 149/109.6 |

OTHER PUBLICATIONS

O. S. Gebizlioglu et al., "A New Mechanism of Toughening Glassy Polymers. 1. Experimental Procedures," *Macromolecules*, 1990, vol. 23, pp. 3968–3974.

A. S. Argon et al., "A New Mechanism of Toughening Glassy Polymers. Theoretical Approach," *Macromolecules*, 1990, vol. 23, pp. 3975–3982.

Witte et al., "Cyclische Imidsáureester aus Nitrilen und Aminoalkoholen," *Liebigs Ann. Chem.*, 1974, pp. 996–1009 (no translation).

*Journal of the American Chemical Society*, Jan. 9, 1974, pp. 268–269.

A. W. Dox, "Acetamidine Hydrochloride," pp. 5–7.

J. A. Frump "Oxazolines. Their Preparation, Reactions, and Applications," *Chemical Reviews*, 1971, vol. 71, No. 5, pp. 483–505.

*Primary Examiner*—Edward A. Miller
*Attorney, Agent, or Firm*—Madson & Metcalf

[57] ABSTRACT

Oxazolines useful as bonding agents in solid rocket propellants are disclosed. The oxazoline bonding agents are capable of polymerizing in the presence of ammonium perchlorate. The bonding agents of the present invention are added to the propellant in a range from about 0.1% to about 3% concentration. Importantly, there is no increase in ammonia liberated above baseline propellant values and no increase in end of mix viscosities by using the oxazolines according to the present invention which provides substantial processing savings.

20 Claims, 1 Drawing Sheet

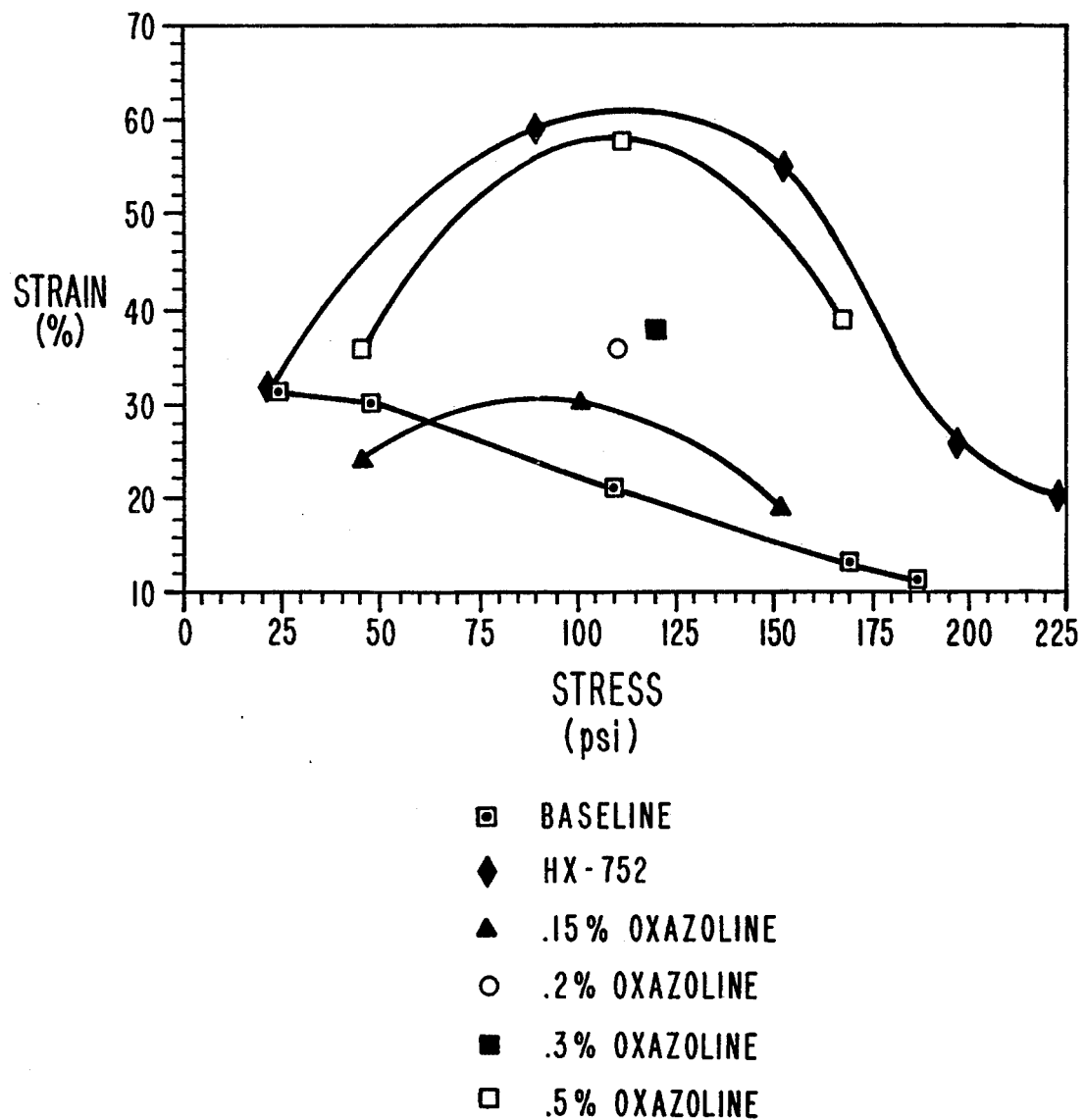

OXAZOLINE BONDING AGENTS IN COMPOSITE PROPELLANTS

BACKGROUND OF THE INVENTION

1. Field of the Invention

This invention relates to bonding agents used in rocket propellants. More specifically, the present invention relates to the use of oxazolines as bonding agents.

2. Technology Background

Solid propellants are used extensively in the aerospace industry. Solid propellants have become a preferred method of powering most missiles and rockets for military, commercial, and space applications. Solid rocket motor propellants have become widely accepted because they are relatively simple to manufacture and use, and because they have excellent performance characteristics.

Typical solid rocket motor propellants are formulated using an oxidizing agent, a fuel, and a binder. At times, the binder and the fuel may be the same. The fuel often includes various reactive metals such as aluminum, magnesium, aluminum/magnesium alloys, etc. In addition to the basic components, it is conventional to add various bonding agents, plasticizers, curing agents, cure catalysts, and other similar materials which aid in the processing or curing of the propellant or contribute to mechanical properties of the cured propellant. A significant body of technology has developed related solely to the processing and curing of solid propellants.

Many types of propellants used in the industry incorporate ammonium perchlorate (AP) as the oxidizer. The AP is generally incorporated into the propellant in particulate form. In order to hold the propellant in a coherent form, the components of the propellant are bound together by a binder, such as, but not limited to, a hydroxy-terminated polybutadiene (HTPB) binder. Such binders are widely used and commercially available. It has been found that such propellant compositions are easy to manufacture and handle, have good performance characteristics, and are economical and reliable. As a result, this type of solid propellant has become a standard in the industry.

Propellants must generally meet various mechanical and chemical performance criteria to be considered acceptable for routine use. For example, it is important that the propellant have desired mechanical characteristics which allow it to be used in a corresponding rocket or missile. It is important that the propellant deform elastically during use to avoid cracking within the propellant grain.

If the propellant cracks, burning within the crack may be experienced during operation of the rocket or missile. Such burning in a confined area may result in an increased surface area of burning propellant or increased burn rate at a particular location. This increase in the burn rate and surface area can directly result in failure of the rocket motor due to over pressurization or burn through of the casing.

Accordingly, propellants are typically subjected to standardized stress and strain tests. The usual configuration of the propellant sample tested is often referred to as a JANNAF Class C specimen. The shape and size of such specimens are standard in the industry. Such specimens are typically placed in an Instron ® testing apparatus and then pulled until the specimen fails. Data is recorded during such tests and objective measures of stress and strain performance are provided.

To make certain that propellant formulations meet the applicable specifications, it is often necessary to employ a bonding agent within the propellant composition. Bonding agents are widely used throughout the solid propellant industry to strengthen the polymeric matrix which binds the oxidizer and fuel together. They help to incorporate solid oxidizer particles into the polymeric binder system. Use of a bonding agent typically improves the stress and strain characteristics of the propellant.

A number of bonding agents are known and conventional. One class of bonding agents are the polyamine bonding agents TEPANOL ® (tetraethylenepentamine acrylonitrile glycidol adduct) and TEPAN ® (partially cyanoacrylated tetraethylenepentamine). TEPANOL ® and TEPAN ® are useful as bonding agents and improve the mechanical properties of isocyanate cured HTPB propellants. TEPANOL ® and TEPAN ® are believed to become chemically linked to the polymeric propellant binder. TEPANOL ® and TEPAN ® also electrostatically coordinate with the AP after forming a perchlorate salt from an acid/base reaction with AP. Thus, TEPANOL ® and TEPAN ® aid in binding the AP particles into the propellant matrix.

TEPANOL ® and TEPAN ®, however, also cause difficulty in the formulation of propellant. TEPANOL ® is relatively basic, and in the presence of AP produces a significant amount of ammonia. This makes it necessary to conduct propellant mixing steps under vacuum and to mix for long periods of time in order to substantially remove the produced ammonia before addition of the curative. It often requires 24 hours or more to adequately remove the ammonia from TEPANOL ® and TEPAN ® systems. This significantly extends propellant processing time and increases costs. Insufficient removal of the ammonia can result in soft cures and nonreproducible mechanical properties because the free ammonia reacts with some of the isocyanate curing agent. These characteristics of TEPANOL ® and TEPAN ® result in significant disadvantages, such as long mix time, high labor costs, and AP attrition.

In another important class of bonding agents, the aziridines (i.e., cyclic ethylene imines), it is believed that a polymeric shell is formed directly around the oxidizer particles by homopolymerization, catalyzed by acidic AP. This hydrophobic layer is then more compatible with the continuous binder phase and results in better bonding of the AP particles. Since this reaction does not occur on nitramine surfaces, aziridines are limited to AP propellants.

Isophthaloyl-bis(methyl-ethyleneimide), known as HX-752 in the industry, is a widely used aziridine bonding agent. HX-752 has the following chemical structure:

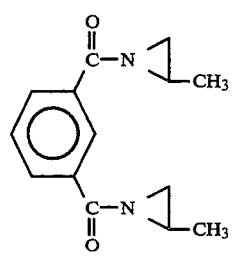

HX-752 is believed to be incorporated into the propellant matrix by ring opening polymerization. HX-752 avoids the production of large amounts of ammonia which plague processes using TEPANOL ®. As a result, some advantages are derived from the use of HX-752.

Even in view of the foregoing, HX-752 is far from ideal as a bonding agent. One significant problem is that of economics. HX-752 presently costs from four to five times as much as TEPANOL ®. Also, some propellants produced using HX-752 have a relatively high mix viscosity, which inhibits processing. It is also believed that HX-752 may be a carcinogen. Thus, it can be seen that the cost and chemical characteristics of HX-752 make it a less than ideal bonding agent. Also, HX-752 as used in the industry does produce some ammonia which may require extra vacuum mixing.

In summary, conventional bonding agents have significant drawbacks. TEPANOL ® and TEPAN ® are problematic because of their tendency to produce large quantities of ammonia during propellant mixing and the other limitations mentioned above. Alternative materials, such as HX-752, also present problems including cost and poor processing characteristics of the propellant.

Accordingly, it would be an advancement in that art to provide bonding agents which overcome some of the significant limitations encountered using conventional bonding agents. A bonding agent which would not raise propellant viscosities and would not produce any ammonia would be an advancement in the art. Use of such a bonding agent would contribute to lower power requirements, shorter mixing times, lower labor costs, faster mixer turnaround times, and less AP attrition. It would also be an advancement in the art to provide such bonding agents which also resulted in propellants having acceptable stress and strain characteristics.

Such bonding agents are disclosed and claimed herein.

SUMMARY OF THE INVENTION

The invention is directed to the use of multifunctional oxazolines as bonding agents in solid rocket propellants which are capable of polymerizing in the presence of an acidic oxidizer, such as ammonium perchlorate (AP). The oxazoline bonding agents used according to the present invention are preferably multifunctional. The oxazoline bonding agents of the present invention are added to the propellant in a range from about 0.1% to about 3% concentration, by weight. Importantly, there is no increase in ammonia liberated and no increase in end of mix viscosity by use of the oxazolines according to the present invention.

BRIEF DESCRIPTION OF THE DRAWING

FIG. 1 is a graphical comparison of the uncorrected stress/strain profile of a propellant formulation prepared with four different weight percent concentrations of an oxazoline bonding agent according to the present invention. These several stress strain values are for different curative (NCO:OH) ratios. The curative ratios are shown in Table 1.

DETAILED DESCRIPTION OF THE INVENTION

The present invention is directed to the use of multifunctional oxazolines as bonding agents in solid rocket propellants. The oxazolines within the scope of the present invention are capable of polymerizing in the presence of an acidic oxidizer, such as AP. Once polymerized, the oxazoline bonding agents strengthen the polymeric matrix which holds the oxidizer and fuel together. It has been found that oxazolines having at least 2 oxazoline functional groups provide bonding agent characteristics.

The oxazoline bonding agents of the present invention are added to the propellant in a range from about 0.1% to about 3% concentration by weight. Since bonding agents are nonenergetic propellant ingredients, the amount of bonding agents added to the propellant should be minimized. Although small amounts of ammonia are liberated in AP containing propellants, there is no increase in ammonia liberated by use of the oxazolines according to the present invention. In addition, viscosity measurements of propellants containing oxazoline bonding agents of the present invention maintain the favorable processing viscosity of baseline propellants without a bonding agent. HX-752 has been known to increase propellant viscosity. Thus, use of the oxazoline bonding agents of the present invention results in substantial propellant processing savings from a reduction of man hours and faster equipment turn around time.

The multifunctional oxazolines of the present invention include cyclic and acyclic structures having reactive oxazoline moieties, that is oxazolines which are susceptible to polymerization by a cationic polymerization catalyst, such as AP or ammonium nitrate (AN). The bonding agents of the present invention contain multiple oxazoline functional groups, with preferably 2 or 3 oxazoline groups. Although bonding agents having more than 3 oxazolines are embraced by the present invention, those skilled in the art will appreciate that such oxazolines are more complex to synthesize and are more expensive. The present invention also includes mixtures of multifunctional and monofunctional oxazolines such as mono- and difunctional oxazolines, mono- and trifunctional oxazolines, or mono-, di-, and trifunctional oxazolines.

One particularly preferred class of oxazoline bonding agents within the scope of the present invention has the following general formula:

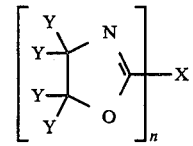

where X is a polyvalent moiety selected from $C_1$ to $C_{18}$ alkyl, branched alkyl, cycloalkyl, phenyl, substituted phenyl, or monocyclic heterocyclic compounds; the Y groups may be the same or different, hydrogen, $C_1$ to $C_6$ lower alkyl, or phenyl; and n is from 1 to 3. As used herein, phenyl substituents include, but are not limited to, lower alkyl, branched alkyl, halogen, nitro, amino, substituted amino, alkoxy, acyl, and carbonyl containing moieties such as carboxyl, ester, ketone, etc. The monocyclic heterocyclic compounds used herein include heteroatoms selected from nitrogen, sulfur, and oxygen. Possible heterocycles which may be used include pyridine and imidazole.

Oxazolines and methods of preparing oxazolines are known to those skilled in the art. A good survey of oxazoline chemistry is set forth in J. A. Frump, "Oxazolines, Their Preparation, Reactions, and Applications," Chemical Reviews, vol. 71, no. 5, pp. 483–505 (1971). The following are examples of a few specific oxazolines which may be used as bonding agents within the scope of the present invention. They are intended to be purely exemplary and should not be viewed as a limitation on any claimed embodiment.

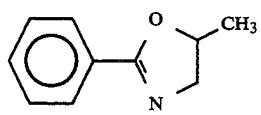

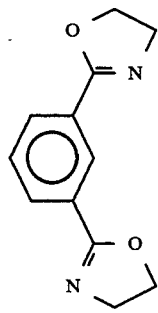

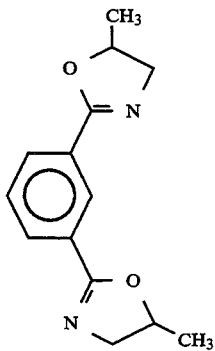

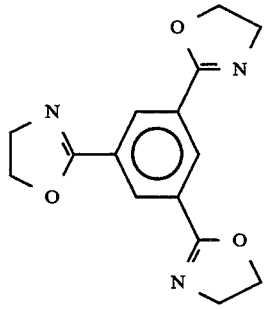

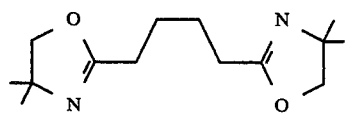

The oxazoline bonding agents of the present invention are included in propellant compositions which typically include an oxidizing salt, a fuel, and a binder. The oxidizing salt is preferably acidic, such as ammonium perchlorate (AP), and is capable of functioning as a cationic polymerization catalyst. Thus, the oxidizing salt is capable of polymerizing the oxazoline bonding agent. The oxidizing salt is preferably present in the propellant formulation in the range from about 40% to about 86% by weight. The fuel often includes various reactive metals such as those commonly used in propellant compositions including Al, Mg, Zn, B, W, Zr, Ti, mixtures thereof. The fuel may be present in the propellant up to about 21% by weight. The binder is preferably a hydroxy-terminated polybutadiene based binder present in an amount ranging from about 8% to about 35% by weight.

In addition to the basic components, the propellants of the present invention may include various plasticizers, curing agents, cure catalysts, and other similar materials which aid in the processing or curing of the propellant or contribute to mechanical properties of the cured propellant. A significant body of technology has developed related solely to the processing and curing of solid propellants.

The following examples are offered to further illustrate the present invention. These examples are intended to be purely exemplary and should not be viewed as a limitation on any claimed embodiment.

EXAMPLE 1

While there are simpler and more direct routes of obtaining the bisoxazoline of the aziridine HX-752, the compound was prepared according to the following procedure.

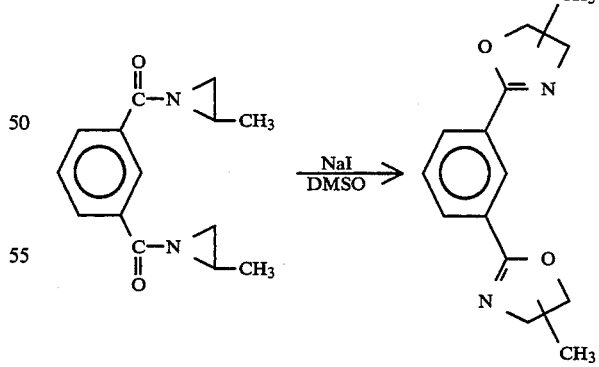

24.96 g HX-752 and 200 mL DMSO were placed into a 250 mL, 3 neck flask equipped with a stirrer, heating mantle, thermowatch, thermometer, and nitrogen inlet. The HX-752 and DMSO were stirred until homogeneous. 1.25 g NaI was then added. The reaction mixture was heated to 55° C. and stirred overnight. The product was then preabsorbed on 200 mL of silica gel and placed on top of 350 mL of silica gel in a 500 mL fritted funnel.

The desired bisoxazoline isomers were eluted with a 50/50 mixture of THF/Hexanes.

Various concentrations of the isomeric bisoxazoline mixture prepared as described above, were used in a propellant formulation. 0.15%, 0.2%, 0.3%, and 0.5% by weight of the bisoxazoline were added to an 87% solids propellant formulation as follows:

| Ingredient | Weight % | Weight % | Weight % | Weight % |
|---|---|---|---|---|
| HTPB & curative | 12.85 | 12.8 | 12.7 | 12.5 |
| Bonding agent | 0.15 | 0.2 | 0.3 | 0.5 |
| Al | 18.00 | 18.00 | 18.00 | 18.00 |
| AP | 69.00 | 69.00 | 69.00 | 69.00 |

End of mix viscosities ranged from 5-9 kilopoise. There was no increase in ammonia liberated above baseline propellant values. The effect of concentration on the mechanical properties of the solid rocket propellant was examined. FIG. 1 is a stress versus strain graph comparing the propellant formulations having the different concentrations of oxazoline bonding agent. The data depicted in FIG. 1 indicates that all concentrations of the bisoxazoline demonstrates bonding agent characteristics compared to the baseline formulation. At 0.5% concentration the stress strain capabilities are similar to those of HX-752 at 0.15% concentration. The points on the graph were determined from various cure ratios for each bonding agent concentration. These cure ratios are shown in Table 1.

TABLE 1

| Bonding Agent | EOM Viscosity | Weight Percent | Cure Ratio | Modulus | Stress | Strain |
|---|---|---|---|---|---|---|
| baseline | 12.5 | 0.00 | 1.00 | 2884 | 187 | 11 |
| baseline | 13.6 | 0.00 | 0.90 | 2281 | 170 | 13 |
| baseline | 6.7 | 0.00 | 0.85 | 1067 | 110 | 21 |
| baseline | 6.9 | 0.00 | 0.80 | 332 | 48 | 30 |
| baseline | 6.4 | 0.00 | 0.75 | 133 | 23 | 31 |
| HX-752 | 10.4 | 0.15 | 0.80 | 973 | 153 | 55 |
| HX-752 | 10.4 | 0.15 | 0.85 | 1882 | 197 | 26 |
| HX-752 | 11.2 | 0.15 | 0.90 | 2296 | 223 | 20 |
| HX-752 | 6.4 | 0.15 | 0.75 | 505 | 90 | 59 |
| HX-752 | 8.0 | 0.15 | 0.70 | 126 | 23 | 32 |
| oxazoline | 7.5 | 0.15 | 0.90 | 1410 | 152 | 19 |
| oxazoline | 6.9 | 0.15 | 0.85 | 717 | 101 | 30 |
| oxazoline | 7.5 | 0.15 | 0.80 | 336 | 46 | 24 |
| oxazoline | 8.8 | 0.50 | 0.9 | 1108 | 168 | 39 |
| oxazoline | 8.5 | 0.50 | 0.85 | 502 | 112 | 58 |
| oxazoline | 8.8 | 0.50 | 0.80 | 209 | 46 | 36 |
| oxazoline | 4.8 | 0.20 | 0.85 | 737 | 111 | 36 |
| oxazoline | 5.6 | 0.30 | 0.85 | 822 | 121 | 38 |

EXAMPLE 2

An oxazoline having the following structure was synthesized according to the procedure described in the *Journal of the American Chemical Society*, vol. 95, no. 1, p. 268 (1974), as further modified below:

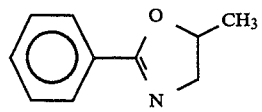

The oxazoline was prepared in two steps. First, 1 mL benzonitrile and 5 mL ethanol were added to a 100 mL round bottom flask and HCl gas was added to the mixture surrounded by an ice bath. Then 1-amino-2-propanol (0.498 g) was added slowly at 0° C. Upon standing over the weekend, white crystals precipitated from solution. 1.23 grams of crude product were collected and washed with ether.

EXAMPLE 3

A bisoxazoline having the following structure was synthesized according to the procedure described in H. Witte and W. Seeliger, *Liebigs Ann. Chem.*, pp. 996-1009, (1974), as further modified below:

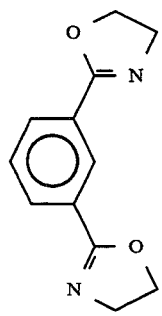

The above bisoxazoline was prepared by combining 81 g 1,3-dicyanobenzene and 6.1 g $ZnCl_2$ in 500 mL chlorobenzene in a 2 liter, 3 neck flask equipped with condenser, stirrer, heating mantle, and thermowatch. 115 g ethanolamine was added dropwise to the stirred solution at reflux temperature (127° C.). After 24 hours the hot solution was removed from an oily layer that formed in the bottom of the flask. The chlorobenzene was then removed by rotoevaporation and 800 mL of a 7:3 mixture of benzene and cyclohexane was added. The solution was heated to dissolve the product for filtration and crystallization. While hot, the solution was filtered through a glass frit funnel containing a layer of decolorizing charcoal on top of a layer of celite filter aid. Upon cooling, the product crystallized and was filtered from solution. The yield was 51.51 g with a melting point of 144°-146° C.

From the foregoing it will be appreciated that the present invention provides effective solid propellant bonding agents which do not liberate ammonia. This simplifies solid propellant processing procedures and reduces processing time.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A composite rocket propellant formulation comprising:
   a polymeric binder;
   an oxidizing salt which functions as a cationic polymerization catalyst; and
   a bonding agent comprising a compound containing multiple oxazoline functional groups which are capable of being polymerized by said oxidizing salt, wherein said bonding agent is incorporated into the composite rocket propellant at a concentration greater than about 0.1% by weight.

2. A composite rocket propellant formulation as defined in claim 1, wherein the oxidizing salt is ammonium perchlorate.

3. A composite rocket propellant formulation as defined in claim 1, wherein the oxidizing salt is ammonium nitrate.

4. A composite rocket propellant formulation as defined in claim 1, wherein the bonding agent has the following general formula:

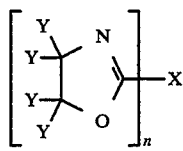

where X is a polyvalent moiety selected from $C_1$ to $C_{18}$ alkyl, branched alkyl, cycloalkyl, phenyl, substituted phenyl, and monocyclic heterocyclic compounds; the Y groups may be the same or different, hydrogen, $C_1$ to $C_6$ lower alkyl, or phenyl; and n is from 2 to 3.

5. A composite rocket propellant formulation as defined in claim 4, wherein the bonding agent comprising a compound containing multiple oxazoline functional groups is combined with a bonding agent comprising a compound containing a single oxazoline functional group, said bonding agent comprising a compound containing a single oxazoline functional group having a general formula as defined in claim 4, except that n is 1.

6. A solid propellant composition comprising:
- an oxidizing salt capable of functioning as a cationic polymerization catalyst present in an amount ranging from about 40% to about 86% by weight;
- a fuel present in an amount ranging from about 0% to about 21% by weight;
- hydroxy-terminated polybutadiene binder present in an amount ranging from about 8% to about 35% by weight; and
- a bonding agent comprising a compound containing multiple oxazoline functional groups present in an amount ranging from about 0.1% to about 3% by weight.

7. A solid propellant composition as defined in claim 6, wherein the fuel includes aluminum particles.

8. A solid propellant composition as defined in claim 6, wherein the fuel includes magnesium particles.

9. A solid propellant composition as defined in claim 6, wherein the oxidizing salt is ammonium perchlorate.

10. A solid propellant composition as defined in claim 6, wherein the oxidizing salt is ammonium nitrate.

11. A solid propellant composition as defined in claim 7, wherein the oxidizing salt is ammonium perchlorate.

12. A solid propellant composition as defined in claim 6, wherein the bonding agent has the following general formula:

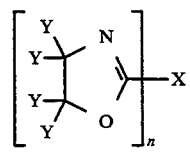

where X is a polyvalent moiety selected from $C_1$ to $C_{18}$ alkyl, branched alkyl, cycloalkyl, phenyl, substituted phenyl, and monocyclic heterocyclic compounds; the Y groups may be the same or different, hydrogen, $C_1$ to $C_6$ lower alkyl, or phenyl; and n is from 2 to 3.

13. A solid propellant composition as defined in claim 12, wherein the bonding agent comprising a compound containing multiple oxazoline functional groups is combined with a bonding agent comprising a compound containing a single oxazoline functional group, said bonding agent comprising a compound containing a single oxazoline functional group having a general formula as defined in claim 12, except that n is 1.

14. A solid propellant composition as defined in claim 11, wherein the bonding agent has the following general formula:

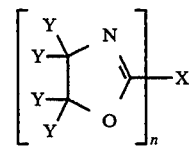

where X is a polyvalent moiety selected from $C_1$ to $C_{18}$ alkyl, branched alkyl, cycloalkyl, phenyl, substituted phenyl, and monocyclic heterocyclic compounds; the Y groups may be the same or different hydrogen, $C_1$ to $C_6$ lower alkyl, or phenyl; and n is from 2 to 3.

15. A solid propellant composition as defined in claim 14, wherein the bonding agent comprising a compound containing multiple oxazoline functional groups is combined with a bonding agent comprising a compound containing a single oxazoline functional group, said bonding agent comprising a compound containing a single oxazoline functional group having a general formula as defined in claim 14, except that n is 1.

16. A solid propellant composition as defined in claim 6, wherein the oxazoline bonding agent is:

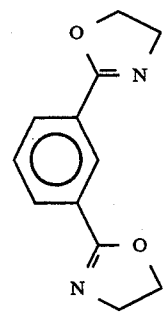

17. A solid propellant composition as defined in claim 13, wherein the bonding agent comprising a compound having a single oxazoline functional group is:

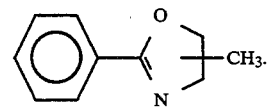

18. A solid propellant composition as defined in claim 6, wherein the oxazoline bonding agent is:

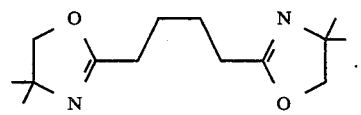
20. A solid propellant composition as defined in claim 6, wherein the oxazoline bonding agent is:
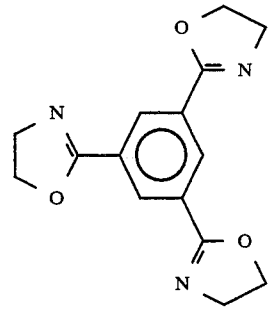
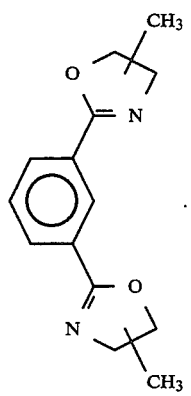
19. A solid propellant composition as defined in claim 6, wherein the oxazoline bonding agent is:
* * * * *